United States Patent
Beck et al.

(10) Patent No.: US 10,995,826 B2
(45) Date of Patent: May 4, 2021

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Johannes Kaltenbach, Friedrichshafen (DE); Michael Wechs, Weissensberg (DE); Michael Trübenbach, Friedrichshafen (DE); Kai Bornträger, Langenargen (DE); Johannes Glückler, Friedrichshafen (DE); Jens Moraw, Markdorf (DE); Gerhard Niederbrucker, Friedrichshafen (DE); Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 5 days.

(21) Appl. No.: 16/607,386

(22) PCT Filed: Mar. 26, 2018

(86) PCT No.: PCT/EP2018/057565
§ 371 (c)(1),
(2) Date: Oct. 23, 2019

(87) PCT Pub. No.: WO2018/197127
PCT Pub. Date: Nov. 1, 2018

(65) Prior Publication Data
US 2020/0040968 A1 Feb. 6, 2020

(30) Foreign Application Priority Data
Apr. 24, 2017 (DE) .................... 10 2017 206 803.5

(51) Int. Cl.
*F16H 3/62* (2006.01)
*F16H 37/06* (2006.01)

(52) U.S. Cl.
CPC .............. *F16H 3/62* (2013.01); *F16H 37/06* (2013.01); *F16H 2200/0069* (2013.01)

(58) Field of Classification Search
CPC .................................. F16H 3/62; F16H 37/06
See application file for complete search history.

(56) References Cited

U.S. PATENT DOCUMENTS 6,960,149 B2   11/2005   Ziemer
8,016,713 B2    9/2011   Phillips et al.
(Continued)

FOREIGN PATENT DOCUMENTS

DE        101 15 995 A1    10/2002
DE    10 2008 032 469 A1    1/2009
(Continued)

OTHER PUBLICATIONS

Thomas Belz: "Varianten von Mehrgang-Planetengetrieben", Mar. 8, 2016 See International Search.
(Continued)

*Primary Examiner* — Derek D Knight
(74) *Attorney, Agent, or Firm* — Davis & Bujold PLLC; Michael J. Bujold

(57) ABSTRACT

A transmission (G) for a motor vehicle which has a transmission input (GW1-A), a transmission output (GW2-A), five planetary gear sets (P1, P2, P3, P4, P5) and six shifting elements (B1, B2, K1, K2, K3, B3). By selectively actuating the six shifting elements (B1, B2, K1, K2, K3, B3), ten forward gears and one reverse gear can be selected between the transmission input (GW1-A) and the transmission output (GW2-A). Further, the drive train is typically incorporated into a motor vehicle.

16 Claims, 7 Drawing Sheets

(56) References Cited

U.S. PATENT DOCUMENTS

| | | | |
|---|---|---|---|
| 8,545,362 B1 | 10/2013 | Goleski et al. | |
| 9,163,705 B1 | 10/2015 | Hwang et al. | |
| 9,506,533 B2 * | 11/2016 | Park | F16H 3/66 |
| 9,822,856 B2 | 11/2017 | Hoffman | |
| 9,909,650 B2 * | 3/2018 | Park | F16H 3/666 |
| 2010/0069191 A1 | 3/2010 | Swales et al. | |
| 2016/0169342 A1 | 6/2016 | Cho et al. | |

FOREIGN PATENT DOCUMENTS

| | | |
|---|---|---|
| DE | 10 2010 007 613 A1 | 11/2010 |
| DE | 10 2014 214 212 A1 | 1/2015 |
| DE | 10 2014 108 826 A1 | 12/2015 |
| DE | 10 2014 117 679 A1 | 3/2016 |
| JP | 2015-194196 A | 11/2015 |
| JP | 2015-197207 A | 11/2015 |
| KR | 10-2016-0072696 A | 6/2016 |

OTHER PUBLICATIONS

German Search Report Corresponding to 10 2017 206 836.1 dated Nov. 23, 2017.
German Search Report Corresponding to 10 2017 206 803.5 dated Nov. 23, 2017.
German Search Report Corresponding to 10 2017 206 816.7 dated Nov. 23, 2017.
International Search Report Corresponding to PCT/EP2018/057564 dated Jul. 9, 2018.
International Search Report Corresponding to PCT/EP2018/057565 dated Jul. 16, 2018.
International Search Report Corresponding to PCT/EP2018/057563 dated Jul. 10, 2018.
Written Opinion Corresponding to to PCT/EP2018/057564 dated Jul. 9, 2018.
Written Opinion Corresponding to PCT/EP2018/057565 dated Jul. 16, 2018.
Written Opinion Corresponding to PCT/EP2018/057563 dated Jul. 10, 2018.

* cited by examiner

| Gear | B1 | B2 | K1 | K2 | K3 | B3/K4 |
|------|----|----|----|----|----|-------|
| 1    | x  |    |    |    | x  |       |
| 2.1  | x  | x  |    |    | x  |       |
| 2.2  | x  | x  |    |    |    | x     |
| 2.3  | x  | x  | x  |    |    |       |
| 2.4  | x  | x  |    | x  |    |       |
| 3    |    | x  |    | x  | x  |       |
| 4    |    | x  | x  | x  |    | x     |
| 5    |    | x  |    |    | x  | x     |
| 6    |    | x  |    |    | x  | x     |
| 7    |    |    | x  | x  | x  | x     |
| 8    |    |    | x  | x  | x  | x     |
| 9    |    |    |    | x  |    | x     |
| 10   |    |    |    | x  | x  |       |
| R1   | x  |    | x  |    |    | x     |
| R2   | x  |    | x  |    | x  |       |
| Z1   | x  |    | x  | x  |    | x     |
| Z2   | x  |    | x  |    |    |       |
| Z3   |    | x  | x  |    | x  |       |

Fig. 7

TRANSMISSION FOR A MOTOR VEHICLE

This application is a National Stage completion of PCT/EP2018/057565 filed Mar. 26, 2018, which claims priority from German patent application serial no. 10 2017 206 803.5 mailed Apr. 24, 2017.

FIELD OF THE INVENTION

The invention relates to a transmission for a motor vehicle, comprising a transmission input and a transmission output, and also a first, a second, a third, a fourth and a fifth planetary gear set, wherein the planetary gear sets each comprise a plurality of elements, wherein a first, a second, a third, a fourth, a fifth and a sixth shifting element are provided, upon the selective actuation thereof variable power flows can be established via the planetary gear sets, shifting various gears between the transmission input and the transmission input.

BACKGROUND OF THE INVENTION

In this case, 'transmission' designates a multi-speed transmission, meaning that a plurality of different transmission ratios can be selected as gears between the transmission input and the transmission output of the transmission by actuating corresponding shifting elements, this preferably taking place automatically. Depending upon the arrangement of the shifting elements, the latter can be clutches or also brakes. Such transmissions are used chiefly in motor vehicles for suitably implementing a tractive effort of a main engine of the corresponding motor vehicle with respect to various criteria.

KR 20160072696 A discloses a transmission comprising five planetary gear sets, each of which are composed of a plurality of elements in the form of a sun gear, a planetary carrier and a ring gear. Also provided are six shifting elements, the selective actuation thereof enabling the realization of different gears between a transmission input and a transmission output of the transmission. A total of ten forward gears and one reverse gear can thus be selected between the transmission input and the transmission output.

SUMMARY OF THE INVENTION

It is an object of the present invention to provide a design alternative to the prior art transmission having ten forward gears and a reverse gear between a transmission input and a transmission output.

This object is achieved on the basis of the preamble of the independent claim(s), in combination with the characterizing features thereof. The subsequent dependent claims each represent advantageous developments of the invention. Furthermore, a motor vehicle drive train, in which use is made of a transmission according to the invention, is the subject matter of the independent claim(s).

According to the invention, a transmission comprises a transmission input and a transmission output, and also a first, a second, a third, a fourth and a fifth planetary gear set. The planetary gear sets therefore each comprise a plurality of elements and are used for guiding a power flow from the transmission input to the transmission output. Also provided are six shifting elements, upon the selective actuation of which variable power flows can be established via the planetary gear sets, shifting various gears between the transmission input and the transmission output.

For the purposes of the invention, the transmission input is preferably formed on an end of a drive shaft, via which drive movement is introduced into the transmission. In the context of the invention, the transmission output can be defined on the end of an output shaft, via which the drive movement transferred according to the selected gear is guided out of the transmission. However, the transmission output can also be formed by the gearing of a gear on which the transferred drive movement can be picked up. The transmission input and the transmission output are preferably arranged axially on opposing ends of the transmission.

For the purposes of the invention, a 'shaft' is understood to mean a rotatable component of the transmission, via which associated components of the transmission are radially and/or axially interconnected for conjoint rotation or via which such a connection can be produced by actuating a corresponding shifting element. The shaft concerned can thus also be present as an intermediate piece, via which a given component can be connected, for example radially connected, to the transmission output.

For the purposes of the invention, 'axial' means an orientation in the direction of a transmission input axis, along which the planetary gear sets are arranged coaxially in relation to one another. Consequently, 'radial' is understood to mean an orientation in a diametrical direction of a shaft situated on the transmission input axis.

The planetary gear sets are preferably arranged axially in the order of first planetary gear set, second planetary gear set, third planetary gear set, fourth planetary gear set and fifth planetary gear set. However, in principle another arrangement would also be possible in the context of the invention.

The invention thus includes the technical teaching that the third element of the second planetary gear set and the second element of the third planetary gear set are connected to each other for conjoint rotation and can be jointly fixed via the first shifting element to a non-rotating component, to which the first element of the fourth planetary gear set can also be fixed by means of the second shifting element. Furthermore, the transmission input is connected to the first element of the second planetary gear set for conjoint rotation therewith, the second element of which is in communication for conjoint rotation with the third element of the fourth planetary gear set. On the other hand, the second element of the fourth planetary gear set is connected, for conjoint rotation therewith, to the transmission output via the third shifting element and can be brought into communication for conjoint rotation with the second element of the fifth planetary gear set, which can furthermore be connected to the first element of the fourth planetary gear set for conjoint rotation therewith by means of the fourth shifting element. In addition, the first element of the third planetary gear set is in communication for conjoint rotation with the third element of the fifth planetary gear set, the first element of which is permanently fixed to a non-rotating component. The third element of the third planetary gear set can be connected to the second element of the second planetary gear set and to the third element of the fourth planetary gear set, for conjoint rotation therewith, via the fifth shifting element. Lastly, in the case of the first planetary gear set there is a first coupling of the first element of the first planetary gear set to a non-rotating component, a second coupling of the second element of the first planetary gear set to the transmission input, and a third coupling of the third element of the first planetary gear set to the third element of the third planetary gear set, two of these couplings being permanent conjointly rotating connections, whereas in the case of the remaining coupling, a conjointly rotating connection can be produced by means of the sixth shifting element.

In other words, in the transmission according to the invention the third element of the second planetary gear set and the second element of the third planetary gear set are permanently connected to each other for conjoint rotation, whereas there is also a permanent conjointly rotating connection between the second element of the second planetary gear set and the third element of the fourth planetary gear set. The first element of the third planetary gear set and the third element of the fifth planetary gear set are likewise permanently connected to each other for conjoint rotation, whereas the first element of the fifth planetary gear set is permanently fixed to a non-rotating component. Furthermore, the transmission input is in permanent communication for conjoint rotation with the first element of the second planetary gear set, whereas the second element of the fourth planetary gear set and the transmission output are permanently connected to each other for conjoint rotation.

By actuating the first shifting element, the third element of the second planetary gear set and the second element of the third planetary gear set are jointly fixed to a non-rotating component, on which the first element of the fourth planetary gear set can also be braked to standstill by engaging the second shifting element. The non-rotating component of the second shifting element can also be embodied separately. The engagement of the third shifting element establishes a conjointly rotating connection of the second element of the fifth planetary gear set to the second element of the fourth planetary gear set and thus also to the transmission output. Furthermore, the second element of the fifth planetary gear set can also be connected to the first element of the fourth planetary gear set for conjoint rotation therewith by actuating the fourth shifting element. In the engaged state, the fifth shifting element connects the second element of the second planetary gear set and the third element of the fourth planetary gear set jointly to the third element of the third planetary gear set.

In the case of the first planetary gear set, there are three couplings of the elements of the first planetary gear set in the transmission according to the invention. Accordingly, there is a first coupling of the first element of the first planetary gear set to a non-rotating component, whereas in the case of the second element of the first planetary gear set, there is a second coupling to the transmission input. Then there is a third coupling of the third element of the first planetary gear set to the third element of the third planetary gear set. Two of the three aforementioned couplings are thus realized as permanent conjointly rotating connections, whereas the remaining coupling in each case is a connection for conjoint rotation which is only produced by engaging the sixth shifting element.

For the purposes of the invention, a 'coupling' is understood to mean a conjointly rotating connection which is either permanent or which is only produced upon actuating a corresponding shifting element.

According to the invention, the non-rotating components of the transmission are permanently stationary components of the transmission, preferably a transmission housing or a part of such a transmission housing or components which are fixedly connected to the transmission housing. The first element of the fifth planetary gear set is non-rotatably connected to a non-rotating component and is therefore permanently stationary. Also, the third element of the second planetary gear set and the second element of the third planetary gear set can be brought jointly to stillstand and the first element of the fourth planetary gear set can be brought to a stillstand itself by actuating the appropriate associated shifting element.

In the case of the invention, the first and the second shifting elements are designed as brakes which, upon actuation, brake the corresponding rotatable component of the transmission or the rotatable components of the transmission interconnected for conjoint rotation to standstill and fix them on a non-rotating component. In contrast, the third, the fourth and the fifth shifting elements are clutches, which upon actuation synchronize the rotational movements of the respective associated rotatable components of the transmission with one another and then connect them to one another for conjoint rotation. Depending on the couplings of the first planetary gear set in which a conjointly rotating connection is produced via the sixth shifting element, the sixth shifting element is a brake or also a clutch.

The first shifting element is preferably disposed axially between the third planetary gear set and the fourth planetary gear set, whereas the second shifting element is in particular positioned on a side of the fifth planetary gear set facing away from the transmission input and facing the transmission output. Furthermore, the third shifting element and the fourth shifting element are preferably jointly arranged axially between the fourth planetary gear set and the fifth planetary gear set and are further preferably arranged axially directly adjacent to each other. In addition, the third and the fourth shifting elements are essentially arranged at the same radial height. Owing to the spatial arrangement of the third and fourth shifting elements, a common supply of these two shifting elements is an option. The fifth shifting element is preferably situated axially between the first planetary gear set and the second planetary gear set.

According to the invention, a particular conjointly rotating connection of the rotatable elements of the planetary gear sets is preferably realized via one or also a plurality of intermediate shafts, which can also be short axial and/or radial intermediate pieces in the event of close spatial positioning of the elements. Specifically, the elements of the planetary gear sets which are permanently interconnected for conjoint rotation can either be individual components interconnected for conjoint rotation or integrally formed. In the latter case, the respective elements and the shaft, if present, are formed by a common component, this being realized in particular in the event of close spatial positioning of the elements in the transmission.

For elements of the planetary gear sets which are only connected to each other for conjoint rotation upon by actuation of a corresponding shifting element, a connection is also realized via one or also a plurality of intermediate shafts.

As a whole, a transmission according to the invention is characterized by a compact design, low component stresses, high gear meshing efficiency and low transmission losses.

According to an embodiment of the invention, the second element of the first planetary gear set is in communication for conjoint rotation with the transmission input and the third element of the first planetary gear set is in communication for conjoint rotation with the third element of the third planetary gear set, whereas the first element of the first planetary gear set can be fixed to a non-rotating component by means of the sixth shifting element.

In this case, the second element of the first planetary gear set is thus permanently connected to the transmission input for conjoint rotation therewith and the third element of the first planetary gear set is connected to the third element of the third planetary gear set for conjoint rotation therewith, whereas the first element of the first planetary gear set is only fixed to a non-rotating component upon actuation of the sixth shifting element. The sixth shifting element is therefore preferably situated axially on a side of the first planetary gear set which faces the transmission input.

According to an alternative design option of the invention, the first element of the first planetary gear set is fixed to a non-rotating component, whereas the third element of the first planetary gear set is in communication for conjoint rotation with the third element of the third planetary gear set. In contrast, the second element of the first planetary gear set can be connected to the transmission input for conjoint rotation therewith by means of the sixth shifting element.

In this variant, the first element of the first planetary gear set is thus permanently fixed to a non-rotating component, whereas the third element of the first planetary gear set is permanently in communication for conjoint rotation with the third element of the third planetary gear set. By engaging the sixth shifting element, the second element of the first planetary gear set is connected to the transmission input for conjoint rotation therewith. The sixth element is thus preferably situated axially between the first planetary gear set and the second planetary gear set and is further preferably disposed axially adjacent to the fifth shifting element and radially inward with respect thereto.

According to a further alternative embodiment of the invention, the first element of the first planetary gear set is fixed to a non-rotating component, whereas the second element of the first planetary gear set is in communication for conjoint rotation with the transmission input. In contrast, the third element of the first planetary gear set can be connected to the third element of the third planetary gear set, for conjoint rotation therewith, by means of the sixth shifting element.

In this case, the first element of the first planetary gear set is therefore also permanently fixed to a non-rotating component and the second element of the first planetary gear set is continuously connected to the transmission input for conjoint rotation therewith, whereas a conjointly rotating connection of the third element of the first planetary gear set to the third element of the third planetary gear set is only produced upon engagement of the sixth shifting element. The sixth shifting element is preferably situated axially in the gear plane of the first planetary gear set and is thus positioned essentially at the same axial extent as the first planetary gear set and in such a way that it radially surrounds the latter.

In the aforementioned variants of a transmission according to the invention, ten forward gears and two reverse gears can be realized by selectively engaging three of the shifting elements in each case. Accordingly, a first forward gear is selected by actuating the first, the fourth and the fifth shifting elements, whereas a second forward gear is selected by engaging the first, the second and the fifth shifting elements. However, as an alternative to this a second forward gear can also be selected by engaging the first, the second and the sixth shifting elements or by actuating the first, the second and the third shifting elements or by actuating the first, the second and the fourth shifting elements. Furthermore, actuating the second, the fourth and the fifth shifting elements gives rise to a third forward gear, whereas a fourth forward gear can be selected by actuating the second, the fourth and the sixth shifting elements. Also, a fifth forward gear can be selected by engaging the second, the third and the sixth shifting elements, wherein the second, the fifth and the sixth shifting elements must be actuated for shifting into a sixth forward gear. In contrast, it is possible to shift into a seventh forward gear by actuating the third, the fifth and the sixth shifting elements, whereas an eighth forward gear can be selected by actuating the fourth, the fifth and the sixth shifting elements. A ninth forward gear can be selected by actuating the third, the fourth and the sixth shifting elements, whereas the third, the fourth and the fifth shifting elements must be engaged for shifting into a tenth forward gear.

A first reverse gear is obtained by actuating the first, the fourth and the sixth shifting elements, whereas a second reverse gear is selected by engaging the first, the third and the fifth shifting elements.

With appropriate selection of stationary gear ratios of the planetary gear sets, suitable transmission ratios for use in a motor vehicle is thus realized. For a consecutive shifting of the forward gears in sequential order, it is always necessary to change the state of two shifting elements in each case by disengaging one of the shifting elements involved in the previous forward gear and by engaging another shifting element in order to shift into the subsequent forward gear. This also has the consequence that shifting between the gears can proceed very rapidly.

In the transmission according to the invention, a reverse gear for a drive via the main engine arranged upstream of the transmission is advantageously realizable. This can be realized as an alternative or also in addition to an arrangement of an electric machine in the transmission, in order that a reverse drive of the motor vehicle is still realizable in the event of a failure of the electric machine.

In a further development of the invention, a first additional gear can be selected by actuating the first, the third and the sixth shifting elements, a second additional gear can be selected by actuating the first, the third and the fourth shifting elements, and a third additional gear can be selected by actuating the second, the third and the fifth shifting elements. These additional gears can also be established in the individual aforementioned variants of a transmission according to the invention.

A further design option of the invention is for an individual planetary gear set to be a minus planetary gear set, wherein the first element of the planetary gear set concerned is a sun gear, the second element of the planetary gear set concerned is a planetary carrier, and the third element of the planetary gear set concerned is a ring gear. In a manner known in principle to persons skilled in the art, a minus planet set is composed of the elements sun gear, planetary carrier and ring gear, the planetary carrier supporting at least one but preferably a plurality of planet gears, which individually mesh with both the sun gear and the surrounding ring gear. Out of the five planetary gear sets, one or more planetary gear sets are designed as such minus planet sets. However, particular preference is given to all planetary gear sets being minus planet sets, as this permits a particularly compact design.

As an alternative or also in addition to this, an individual planetary gear set is a plus planet set, wherein the first element of the planetary gear set concerned is then a sun gear, the second element of the planetary gear set concerned is a ring gear, the third element of the planetary gear set concerned is a planetary carrier. Also present in a plus planet set are the elements sun gear, ring gear and planetary carrier, wherein the latter supports at least one planet gear pair in which one planet gear meshes with the inner sun gear and the other planet gear meshes with the surrounding ring gear, and the planet gears mesh with one another. In the transmission according to the invention, one or also a plurality of planetary gear sets can be embodied as such plus planet sets.

Where permitted by a connection of the individual elements, it is possible to convert a minus planet set into a plus planet set, wherein with respect to the embodiment as a minus planet set, the ring gear connection and the planetary carrier connection have to be interchanged and a corresponding stationary transmission ratio must be increased by one. Conversely, a plus planet set could also be replaced with a minus planet set, provided that the connection of the elements of the transmission permits this. With respect to the plus planet set, the ring gear connection and planetary carrier connection would also have to be interchanged and a corresponding stationary transmission ratio would have to be reduced by one. However, all planetary gear sets are preferably embodied as minus planet sets, as already mentioned.

According to a further embodiment of the invention, one or a plurality of shifting elements are each realized as force-locking shifting elements. Force-locking shifting elements have the advantage that they can also be shifted under a load, making it possible to shift gears without interrupting the tractive force. However, the first shifting element is particularly preferably embodied as a positively locking shifting element such as a jaw clutch or a synchronizer. The first shifting element is involved in selecting the two first forward gears and the two reverse gears and must therefore be engaged with the vehicle at standstill. Compared to a force-locking shifting element, a positively locking shifting element has the advantage that only low drag torques arise in the disengaged state, thus increasing efficiency.

In a further development of the invention, the transmission input is coupled to a power take-off for conjoint rotation therewith. In this case, the transmission according to the invention is therefore equipped with a power take-off, via which auxiliary units or the like can be driven. The power take-off can be connected directly to the transmission input of the transmission, although the power take-off preferably hooks up to the second element of the first planetary gear set for conjoint rotation therewith. The power take-off is further preferably situated axially between the first planetary gear set and the transmission input.

According to a further embodiment of the invention, the transmission input is formed on a drive shaft and the transmission output is formed on an output shaft, wherein the input shaft and the output shaft are coaxial to each other. The transmission input is preferably provided on an axial end of the transmission, whereas the transmission output is formed axially on an opposing end of the transmission. This type of arrangement is particularly well-suited for use in a motor vehicle having a drive train aligned in the travel direction of the motor vehicle. As an alternative to this, the transmission output can also be aligned transversely to the transmission input in order to realize a construction which is suitable for a drive train aligned transversely to the travel direction of the motor vehicle. The transmission output can thus be formed by gearing, which meshes with gearing of a shaft arranged axially parallel to the transmission input axis. The axle differential of a drive axle can then be arranged on this shaft.

In a further development of the invention, provision is made for an electric machine, the rotor of which is coupled to one of the rotatable components of the transmission for conjoint rotation therewith. A stator of the electric machine is then preferably non-rotatably connected to a non-rotating component of the transmission, the electric machine is capable of being operated as an electric motor and/or as a generator in order to fulfill various functions. In particular, the electric machine enables purely electric driving, boosting via the electric machine, braking and recovery, and/or synchronization in the transmission. The rotor of the electric machine can be coaxial to the component concerned or arranged axially offset in relation thereto, wherein in the latter case, a coupling is achievable via one or a plurality of intermediate transmission stages in the form of, for example, spur gear stages, or also via a traction drive such as a chain drive.

However, the rotor of the electric machine is preferably coupled to the transmission input for conjoint rotation therewith, thereby constituting purely electric driving of the motor vehicle in a suitable manner. Further preference is given to using one or more of the shifting elements as internal starter elements for electric driving. Particularly well-suited for this purpose are the first shifting element, the fourth shifting element or the fifth shifting element, as each of these elements are engaged in one of the reverse gears as well as in the first forward gear. As a further alternative, use can be made of a separate starter clutch, which is positioned between the electric machine and the gear set.

For purely electric driving, one of the gears in the transmission is selected, wherein a reverse travel of the motor vehicle is also realizable in the forward gears by inducing opposite rotational movement via the electric machine, the reverse travel of the motor vehicle thereby taking place in the transmission ratio of the corresponding forward gear. The transmission ratios of the forward gears can consequently be used for both electric forward travel and electric reverse travel. However, the rotor of the electric machine can also be connected to one of the rotatable components of the transmission other than the transmission input.

According to a further design option of the invention, which is realized in particular in combination with the aforementioned arrangement of an electric machine, provision is also made for a separating clutch, via which the transmission input can be connected to a coupling shaft for conjoint rotation therewith. The coupling shaft then serves as a means of connection to the main engine in the motor vehicle drive train. The advantage of providing the separating clutch is that a connection to the main engine can be interrupted such that the latter is not entrained during purely electric driving. The separating clutch is preferably configured as a force-locking shifting element such as a plate clutch, but can just as well be a positively locking shifting element such as a jaw clutch or synchronizer.

As a general rule, in principle a starter element such as a hydrodynamic torque converter or a friction clutch can be arranged upstream of the transmission. This starter element can then also be a component of the transmission and is used for designing a start-up process by enabling a slip speed between the internal combustion engine and the transmission input of the transmission. One of the shifting elements of the transmission or the separating clutch, if present, can also be configured as such a starter element by providing it in the form of a friction shifting element. In principle, a freewheel can also be arranged with respect to the transmission housing or to another shaft on each shaft of the transmission.

The transmission according to the invention is in particular part of a motor vehicle drive train and is consequently arranged between a main engine (designed in particular as an internal combustion engine) of the motor vehicle and further components of the drive train that follow in the direction of the flow of power to the drive wheels of the motor vehicle. The transmission input of the transmission is either permanently coupled or is capable of being connected, for conjoint rotation, to a crankshaft of the internal combustion engine via an intermediate separating clutch or a starter element, wherein a torsional vibration damper can also be provided between the internal combustion engine and the transmission. On the output side, the transmission is then preferably coupled within the motor vehicle drive train to a transaxle of a drive axle of the motor vehicle, although a connection to a longitudinal differential, via which a distribution to a plurality of driven axles of the motor vehicle occurs, is also possible in this case. The transaxle or longitudinal differential can be arranged with the transmission in a common housing. A torsional vibration damper can also be integrated in this housing.

For the purposes of the invention, two components being 'connected' or 'coupled' or 'in communication with each other' for conjoint rotation indicates a permanent connection of these components such that they cannot rotate independently of each other. These components, which can be elements of the planetary gear sets or shafts or a non-rotating component of the transmission, are accordingly rigidly coupled to each other and a shifting element is not arranged between them.

On the other hand, if a shifting element is arranged between two components of the transmission, then these components are not permanently coupled to each other for conjoint rotation and a conjointly rotating coupling is only established upon actuation of the intermediate shifting element. For the purposes of the invention, an actuation of the shifting element means that the shifting element concerned is engaged and the components directly coupled thereto are consequently synchronized with one another in terms of their rotary movements. In the case in which the shifting element concerned is designed as a positively locking shifting element, the components directly interconnected for conjoint rotation via this shifting element will operate at the same speed, whereas in the case of a force-locking shifting element, even upon actuation thereof there may be speed differences between the components. This state, desired or not, is still termed 'conjointly rotating connection of the respective components via the shifting element' in the context of the invention.

The invention is not limited to the stated combination of the features of the main claim or of the claims dependent thereon. Individual features, including ones that arise from the claims, the following description of preferred embodiments of the invention or directly from the drawings, may also be combined with one another. The use of reference signs for referencing the claims to the drawings shall not be construed as limiting the scope of protection of the claims.

BRIEF DESCRIPTION OF THE DRAWINGS

Advantageous embodiments of the invention, which shall be explained in the following, are illustrated in the drawings. Shown are:

FIG. 7 an example of a shift pattern of the transmissions from FIGS. 2 to 6.

DETAILED DESCRIPTION OF THE PREFERRED EMBODIMENTS

Figure 1:
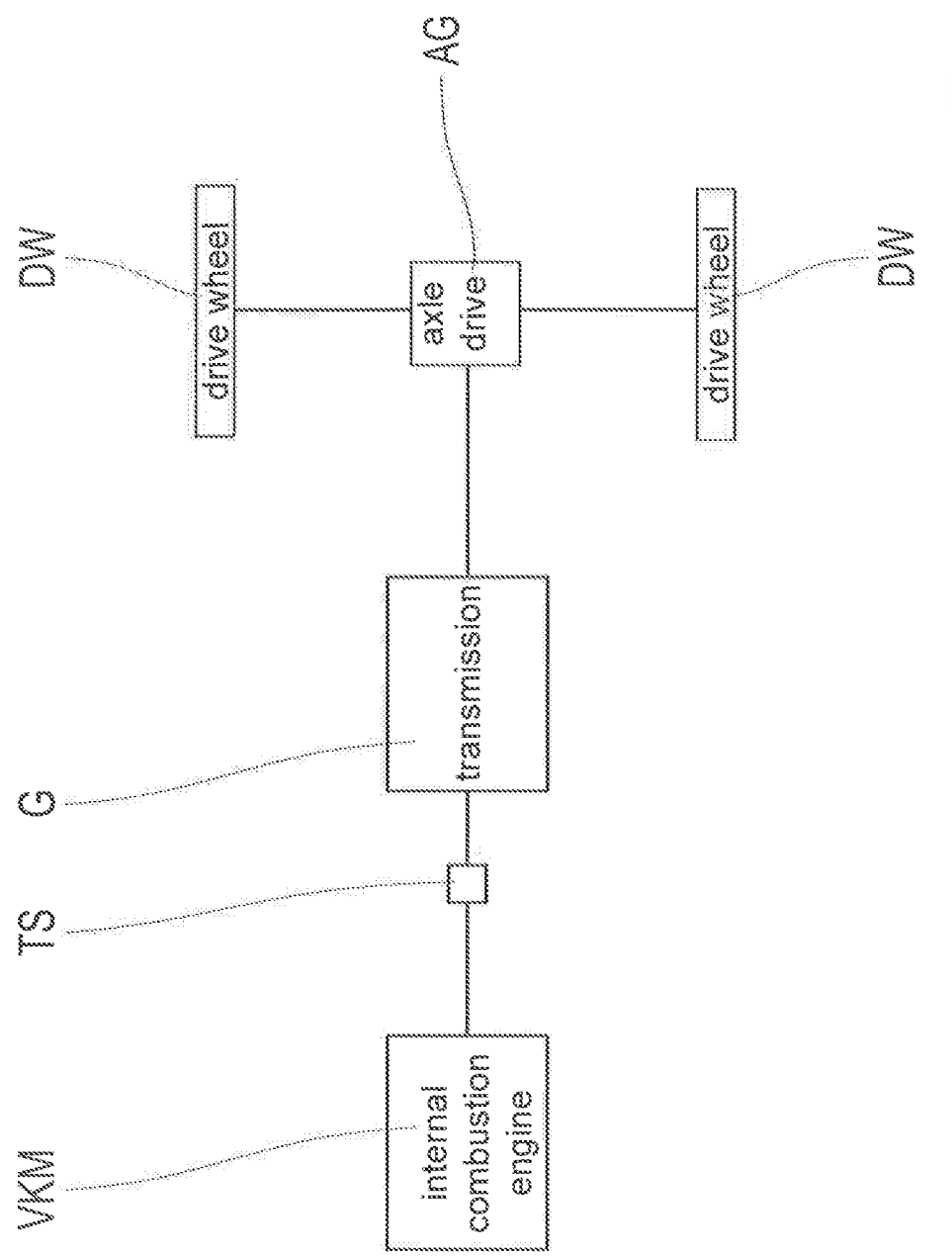
FIG. 1 a schematic view of a motor vehicle drive train in which use is made of a transmission according to the invention.

FIG. 1 shows a schematic view of a motor vehicle drive train, in which an internal combustion engine VKM is connected to a transmission via an intermediate torsional vibration damper TS. A transaxle AG, via which a driving power is distributed to drive wheels DW of a drive axle of the motor vehicle, is disposed downstream of the transmission G, on the output side thereof. The transmission G and the transaxle AG can be combined in a common transmission housing, in which the torsional vibration damper TS can also be integrated. As can also be discerned in FIG. 1, the internal combustion engine VKM, the torsional vibration damper TS, the transmission G and the transaxle AG are aligned in the direction of travel of the motor vehicle.

Figure 2:
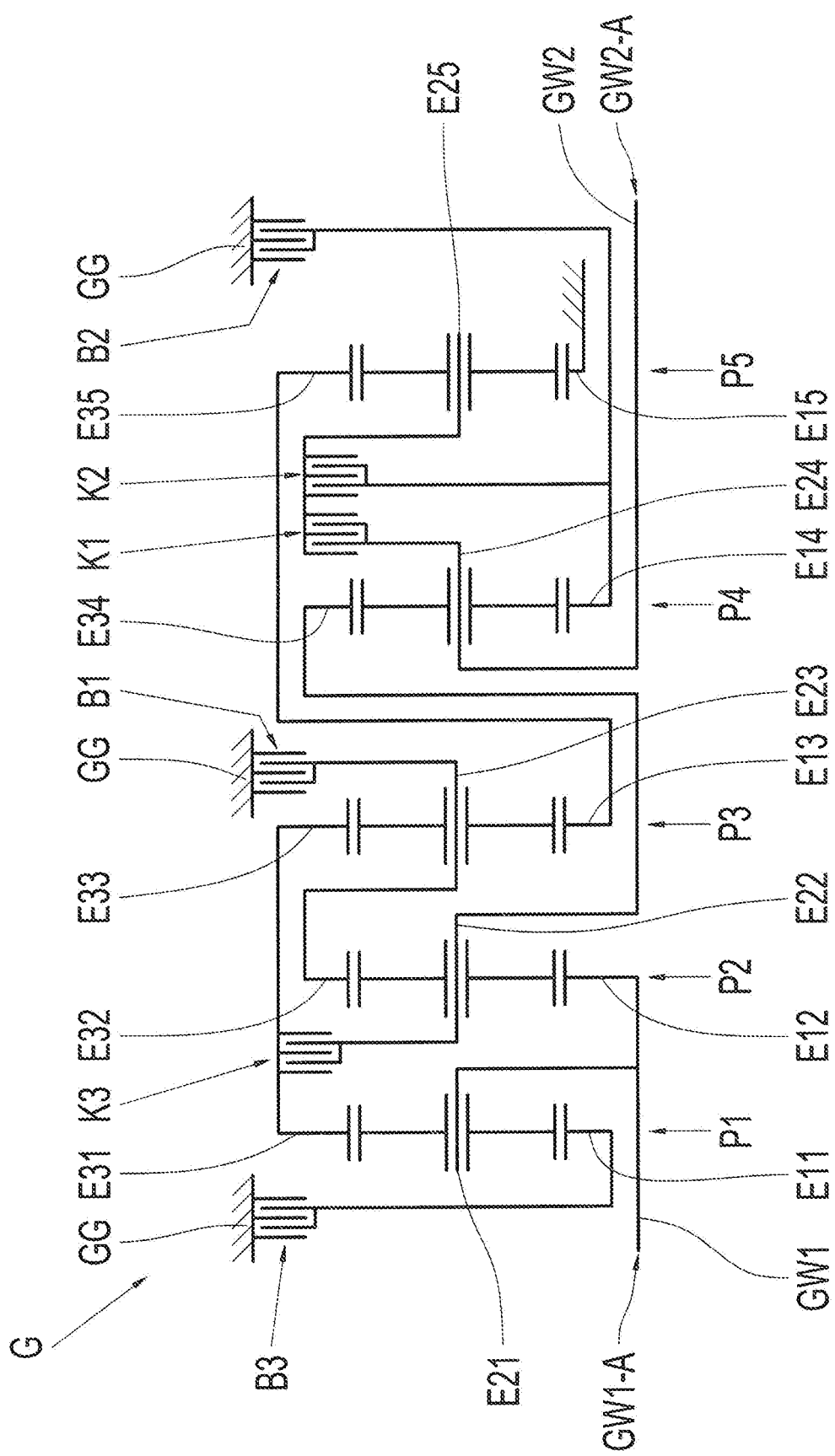
FIG. 2 a schematic view of a transmission according to a first embodiment of the invention.

FIG. 2 is a schematic illustration of the transmission G according to a first embodiment of the invention. As can be discerned, the transmission G comprises a first planetary gear set P1, a second planetary gear set P2, a third planetary gear set P3, a fourth planetary gear set P4 and a fifth planetary gear set P5. Each of the planetary gear sets P1, P2, P3, P4 and P5 has, respectively, a first element E11, E12, E13, E14 and E15, respectively, a second element E21, E22, E23, E24 and E25, respectively, and a third element E31, E32, E33, E34 and E35, respectively. The respective first elements E11, E12, E13, E14 and E15, respectively, are each formed by a sun gear of the corresponding planetary gear sets P1, P2, P3, P4 and P5, respectively, whereas the respective second elements E21, E22, E23, E24 and E25, respectively, are each planetary carriers in the planetary gear sets P1, P2, P3, P4 and P5, respectively. The remaining elements, i.e., the third elements E31, E32, E33, E34 and E35, respectively are then formed by a corresponding ring gear of the corresponding planetary gear set P1, P2, P3, P4 and P5, respectively.

In the present case, the planetary gear sets P1, P2, P3, P4 and P5 are each designed as minus planet sets, in which the corresponding planetary carrier supports one, but preferably a plurality of rotatably mounted planet gears, which mesh individually with the radially inner sun gear and with the surrounding ring gear.

Where permitted by the connection, one or more of the planetary gear sets P1, P2, P3, P4 and P5 could also be embodied as plus planet sets. In a plus planet set, the planetary carrier then supports at least one planet gear pair, one of the planet gears of which meshes with the radially inner sun gear, the other planet gear of which meshes with the radially surrounding ring gear, and the planet gears of the gear pair also mesh with each other. In comparison to a corresponding embodiment as a minus planet set, for conversion to a plus planet set the respective second elements E21, E22, E23, E24 and E25, respectively would then have to be formed by the respective ring gears and the respective third elements E31, E32, E33, E34 and E35, respectively would have to be formed by the respective planetary carriers, and the respective stationary transmission ratios would also have to be increased by 1.

In the present case, the first planetary gear set P1, the second planetary gear set P2, the third planetary gear set P3, the fourth planetary gear set P4 and the fifth planetary gear set P5 are arranged axially in the order first planetary gear set P1, second planetary gear set P2, third planetary gear set P3, fourth planetary gear set P4 and fifth planetary gear set P5 between a transmission input GW1-A and a transmission output GW2-A.

The transmission input GW1-A and the transmission output GW2-A are arranged coaxially to each other on opposing axial ends of the transmission G. In the motor vehicle drive train of FIG. 1, the transmission input GW1-A thus serves as a means of connection to the internal combustion engine VKM, whereas at the transmission output GW2-A, the transmission G is connected to the subsequent transaxle AG.

As can be discerned in FIG. 2, the transmission G comprises in total six shifting elements in the form of a first shifting element B1, a second shifting element B2, a third shifting element K1, a fourth shifting element K2, a fifth shifting element K3 and a sixth shifting element B3. The shifting elements B1, B2, K1, K2, K3 and B3 are each embodied as force-locking shifting elements, preferably as plate shifting elements. In the present case, the third shifting element K1, the fourth shifting element K2 and the fifth shifting element K3 are designed as clutches, whereas the first shifting element B1, the second shifting element B2 and the sixth shifting element B3 are brakes.

In the present case, the second element E21 of the first planetary gear set P1 and the first element E12 of the second planetary gear set P2 are connected to each other for conjoint rotation and are jointly in communication for conjoint rotation with a drive shaft GW1, which defines the transmission input GW1-A on one axial end. The third element E31 of the first planetary gear set on the other hand is connected to the third element E33 of the third planetary gear set P3 for conjoint rotation therewith, the second element E23 of which is in communication for conjoint rotation with the third element E32 of the second planetary gear set P2 and can be fixed jointly therewith on a non-rotating component GG by means of the first shifting element B1. The non-rotating elements GG are preferably a transmission housing of the transmission G or a part of such a transmission housing.

Furthermore, the first element E13 of the third planetary gear set is connected, for conjoint rotation therewith, to the third element E35 of the fifth planetary gear set P5, wherein the first element E15 of the fifth planetary gear set P5 is permanently fixed to a non-rotating component GG. In addition, the first element E14 of the fourth planetary gear set P4 can be fixed to the non-rotating component GG by engaging the second shifting element B2, wherein the first element E14 of the fourth planetary gear set P4 can furthermore be connected, for conjoint rotation therewith, to the second element E25 of the fifth planetary gear set P5 by actuating the fourth shifting element K2.

In addition to the conjointly rotating connection of the first element E14 of the fourth planetary gear set P4, the third shifting element K1 can be used to bring the second element E25 of the fifth planetary gear set P5 in communication for conjoint rotation with the second element E24 of the fourth planetary gear set P4, which is permanently connected to an output shaft GW2 for conjoint rotation therewith. The output shaft GW2 thus forms the transmission output GW2-A on an axial end of the transmission G opposite the transmission input GW1-A. Accordingly, engaging the third shifting element K1 results in a conjointly rotating connection of the second element E25 of the fifth planetary gear set P5 to the output shaft GW2.

Furthermore, the third element E34 of the fourth planetary gear set P4 is permanently connected, for conjoint rotation therewith, to the second element E22 of the second planetary gear set P2 and can be connected jointly with the latter element for conjoint rotation with the third element E31 of the first planetary gear set P1 and the third element E33 of the third planetary gear set P3 by engaging the fifth shifting element K3. Lastly, the first element E11 of the first planetary gear set P1 can be fixed to a non-rotating component GG via the sixth shifting element B3.

The first shifting element B1 is situated axially between the third planetary gear set P3 and the fourth planetary gear set P4, whereas the second shifting element B2 is arranged axially on a side of the fifth planetary gear set P5 facing the transmission output GW2-A.

As can also be discerned in FIG. 2, the third shifting element K1 and the fourth shifting element K2 are jointly positioned axially between the fourth planetary gear set P4 and the fifth planetary gear set P5 and are thus situated axially directly adjacent to each other. In addition, the third shifting element K1 and the fourth shifting element K2 are arranged radially at essentially the same height. Owing to the spatial arrangement of the third shifting element K1 and the fourth shifting element K2, a joint supply of both shifting elements K1 and K2 via a common supply line is thus an option with the transmission G.

The fifth shifting element K3 is arranged axially between the first planetary gear set P1 and the second planetary gear set P2, whereas the sixth shifting element B3 is arranged axially on a side of the first planetary gear set P1 facing the transmission input GW1-A.

Figure 3:
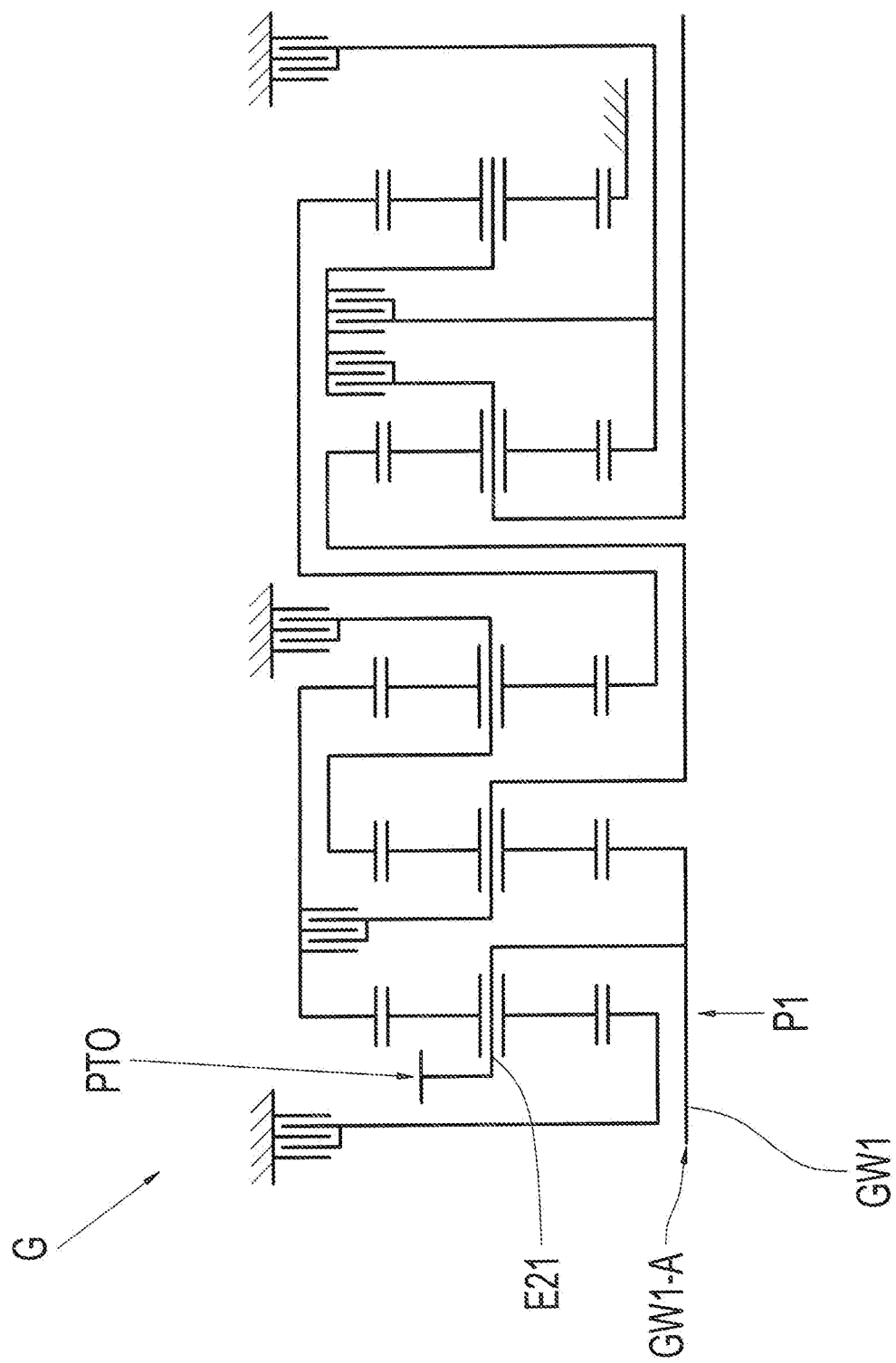
FIG. 3 a schematic illustration of a transmission according to a second design option of the invention.

In addition, FIG. 3 is a schematic illustration of a transmission G according to a second embodiment of the invention, which essentially corresponds to the preceding variant according to FIG. 2. The only difference is that in addition, provision is made for a power take-off PTO, which is connected to the transmission input GW1-A for conjoint rotation therewith. Specifically, the power take-off PTO is connected, for conjoint rotation therewith, to the second element E21 of the first planetary gear set P1, which is in turn in communication for conjoint rotation with the drive shaft GW1 and thus also with the transmission input GW1-A. The embodiment from FIG. 3 otherwise corresponds to the preceding variant according to FIG. 2, hence reference is made to the description pertaining thereto.

Figure 4:
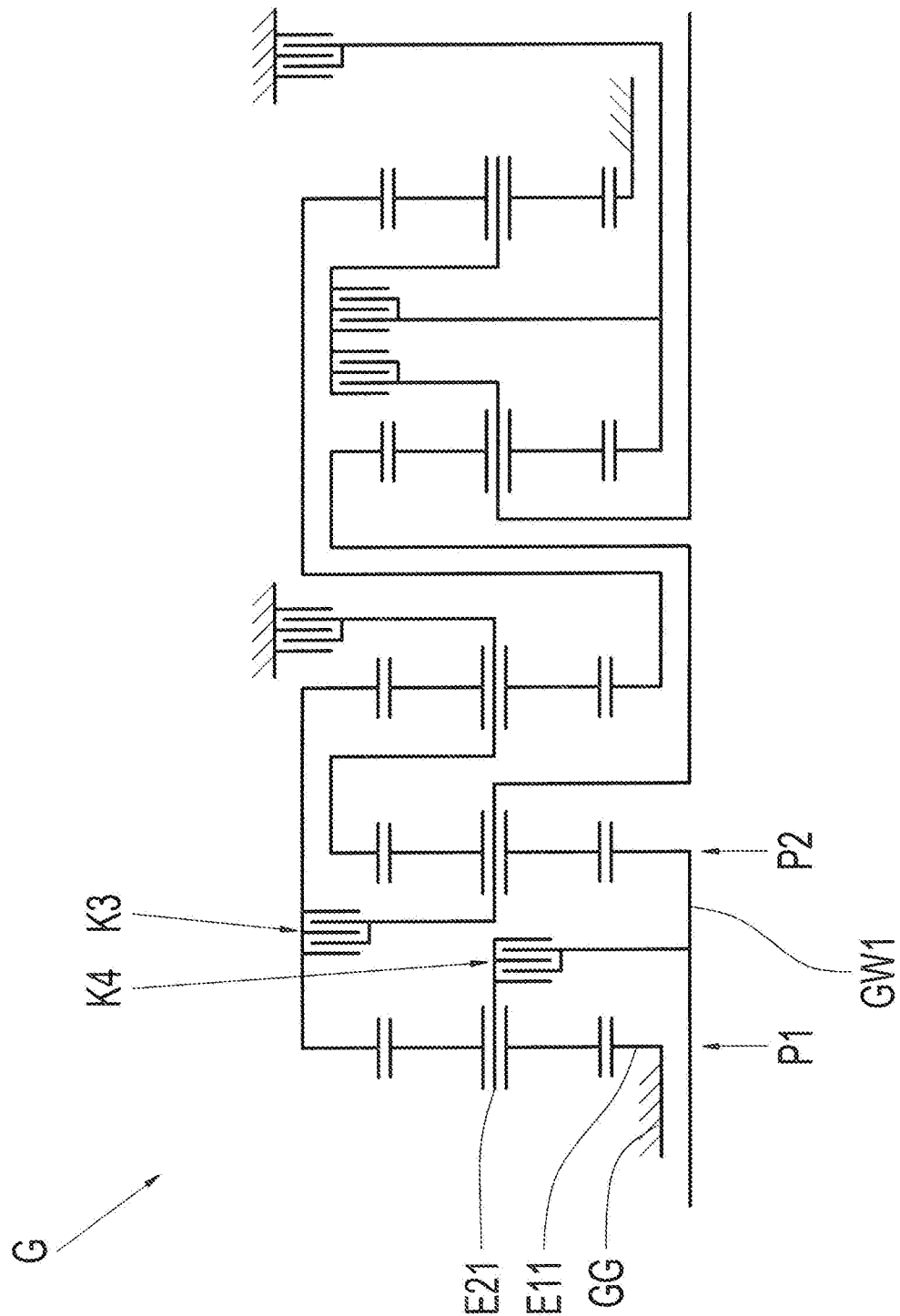
FIG. 4 a schematic view of a transmission according to a third embodiment of the invention.

FIG. 4 shows a schematic view of a transmission G according to a third design option of the invention. This design option also corresponds by and large to the variant according to FIG. 2, the difference being that the first element E11 of the first planetary gear set B1 is permanently fixed to a non-rotating component GG, whereas a connection for conjoint rotation between the second element E21 of the first planetary gear set P1 and the drive shaft GW1 is only produced upon engagement of a sixth shifting element K4. The sixth shifting element K4 is arranged axially between the first planetary gear set P1 and the second planetary gear set P2 and is axially adjacent to the fifth shifting element K3. In addition, the sixth shifting element K4 is positioned radially inwardly in relation to the fifth shifting element K3, wherein owing to the spatial arrangement of the shifting elements K3 and K4, a joint supply would also be conceivable here. The design option according to FIG. 4 otherwise corresponds to the variant according to FIG. 2, hence reference is made to the description pertaining thereto.

Figure 5:
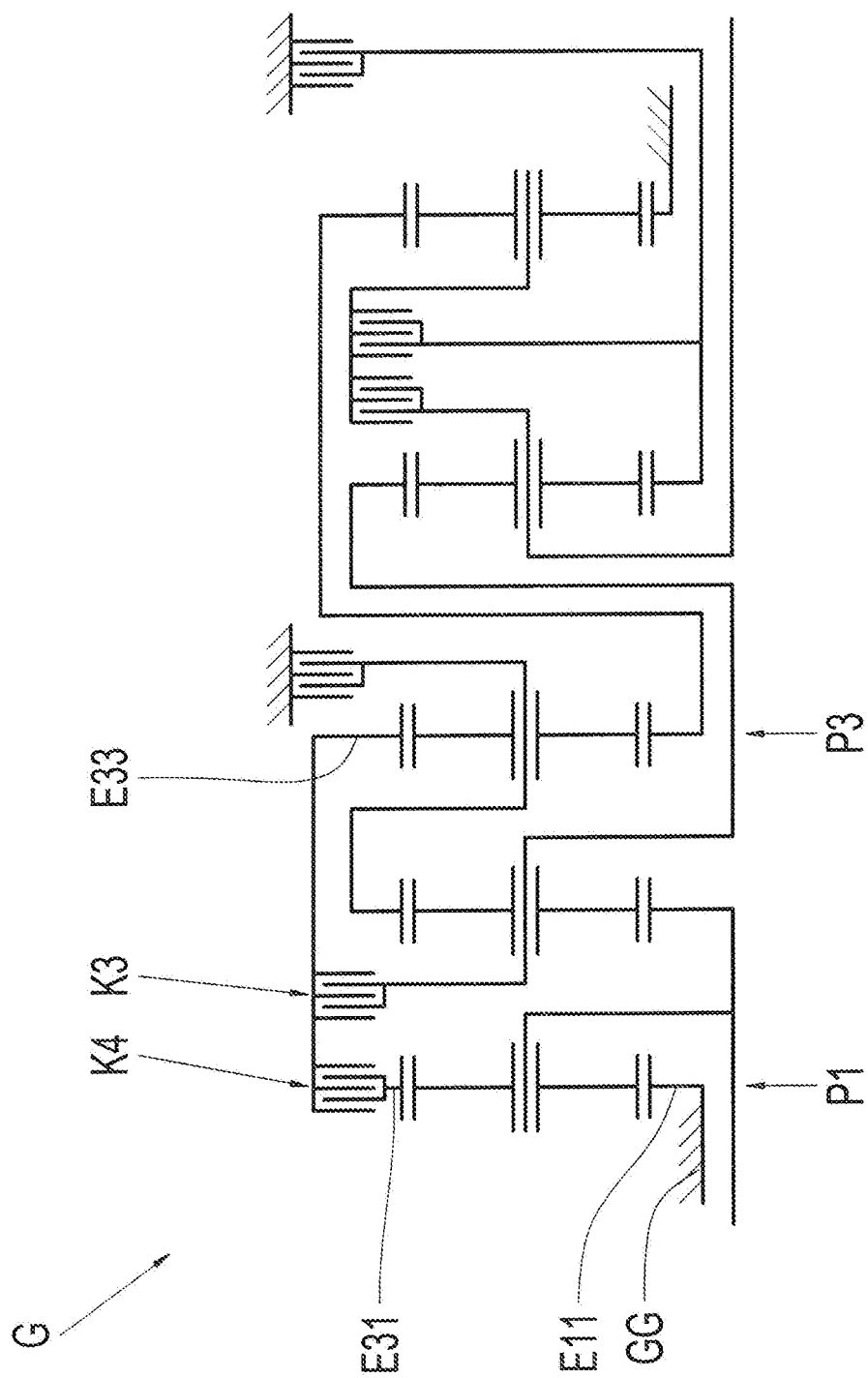
FIG. 5 a schematic illustration of a transmission according to a fourth design option of the invention.

Furthermore, FIG. 5 is a schematic illustration of a transmission G according to a fourth embodiment of the invention, which again corresponds by and large to the design option according to FIG. 2. However, the difference is that the first element E11 of the first planetary gear set P1 is permanently fixed to a non-rotating component GG, whereas a conjointly rotating connection of the third element P31 of the first planetary gear set P1 to the third element E33 of the third planetary gear set P3 is only produced in the engaged state of a sixth shifting element K4. This sixth shifting element K4 is arranged axially in the gear plane of the first planetary gear set P1 and in such a way that it radially surrounds the latter. Owing to the spatial arrangement in the vicinity of the fifth shifting element K3, it is possible to realize a common supply of the fifth shifting element K3 and of the sixth shifting element K4. The embodiment according to FIG. 5 otherwise corresponds to the variant according to FIG. 2, hence reference is made to the description pertaining thereto.

Figure 6:
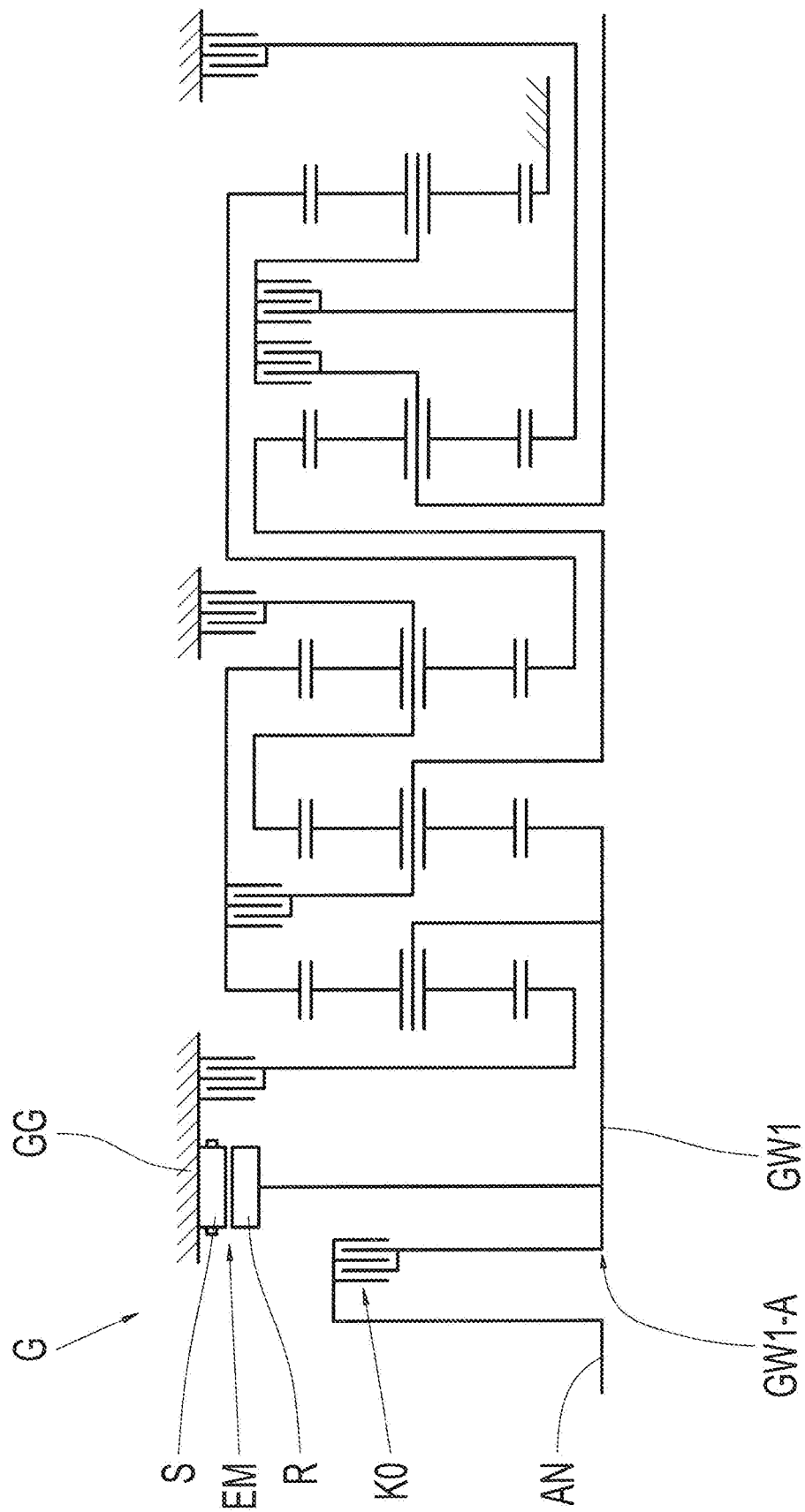
FIG. 6 a schematic view of a transmission according to a fifth embodiment of the invention.

Lastly, FIG. 6 shows a schematic illustration of a transmission G according to a fifth embodiment of the invention. This embodiment also essentially corresponds to the variant according to FIG. 2, the difference being that in addition, provision is made of an electric machine EM, the stator S of which is fixed to a non-rotating component GG, whereas a rotor R of the electric machine EM is connected to the drive shaft GW1 for conjoint rotation therewith. At the transmission input GW1-A, the drive shaft GW1 can furthermore be connected to a coupling shaft AN for conjoint rotation therewith via an intermediate separating clutch K0, which in this case is designed as a plate shifting element, the coupling shaft AN in turn being connected to a crankshaft of the internal combustion engine VKM by means of the intermediate torsional vibration damper TS. Owing to the conjointly rotating connection of the rotor R to the drive shaft GW1, the electric machine is positioned coaxially to the drive shaft GW1.

Purely electric driving is achievable via the electric machine EM, wherein in this case the separating clutch K0 is disengaged in order to uncouple the transmission input GW1-A from the coupling shaft AN and not to entrain the internal combustion engine VKM. Since the embodiment according to FIG. 6 otherwise corresponds to the variant according to FIG. 2, reference is made to the description pertaining thereto.

An example of a shifting scheme for the transmission G from FIGS. 2 to 6 is represented in table form in FIG. 7. As can be discerned, a total of ten forward gears 1 to 10 and two reverse gears R1 and R2 can be realized, wherein the respective shifting elements B1, B2, K1, K2, K3 and B3 or K4 engaged in the respective forward gears 1 to 10 and reverse gears R1 and R2 are indicated by an X in each case in the columns of the shifting scheme. In each case three of the shifting elements B1, B2, K1, K2, K3 and B3 or K4 are engaged in each of the forward gears 1 bis 10 and in the reverse gears R1 and R2, wherein in the case of a consecutive shifting of the forward gears 1 to 10 (with the exception of variants 2.2 and 2.3 of a second forward gear), one of the shifting elements involved must be disengaged and another shifting element must subsequently be engaged.

As can be discerned in FIG. 7, by actuating the first shifting element B1, the fourth shifting element K2 and the fifth shifting element K3 it is possible to shift into a first forward gear 1, from which it is possible to shift into a second forward gear 2.1 by disengaging the fourth shifting element K2 and subsequently engaging the second shifting element B2. As an alternative to this, it is also possible to shift into a second forward gear 2.2 by disengaging both the fourth shifting element K2 and the fifth shifting element K3 and engaging the second shifting element B2 and the sixth shifting element B3 or K4. As a further alternative, it is also possible to shift into a second forward gear 2.3 by disengaging the fourth shifting element K2 and the fifth shifting element K3 and engaging the second shifting element B2 and the third shifting element K1. Also, it is possible to shift from the first forward gear 1 into a second forward gear 2.4 by disengaging the fifth shifting element K3 and engaging the second shifting element B2. It is preferable to use the forward gears 2.1 and 2.4, as in this case it is only necessary to change the shifting state of two shifting elements with respect to the first forward gear 1.

Furthermore, a third forward gear 3 is selected by engaging the second shifting element B2, the fourth shifting element K2 and the fifth shifting element K3. It is then possible to shift into a fourth forward gear 4 by disengaging the fifth shifting element K3 and engaging the sixth shifting element B3 or K4. Next, it is possible to shift into a fifth forward gear 5 by disengaging the fourth shifting element K2 and actuating the third shifting element K1, wherein it is possible to shift from this gear into a sixth forward gear 6 by disengaging the third shifting element K1 and engaging the fifth shifting element K3. For shifting into a seventh forward gear 7, it is then necessary to disengage the second shifting element B2 and engage the third shifting element K1.

It is then possible to shift from the seventh forward gear 7 into an eighth forward gear 8 by disengaging the third shifting element K1 and engaging the fourth shifting element K2. To upshift into a ninth forward gear 9, it is subsequently necessary to disengage the fifth shifting element K3 and engage the third shifting element K1. Lastly, shifting from the ninth forward gear 9 into the tenth forward gear 10 is accomplished by disengaging the sixth shifting element B3 or K4 and then engaging the fifth shifting element K3.

Conversely, the first reverse gear R1, in which reverse travel of the motor vehicle is also realizable in the internal combustion engine VKM driving mode, is selected by engaging the first shifting element B1, the fourth shifting element K2 and the sixth shifting element B3 or K4, whereas the second reverse gear R2 is selected by actuating the first shifting element B1, the third shifting element K1 and the fifth shifting element K3.

In the transmissions of FIGS. 2 to 6, it is also possible to select additional gears Z1 to Z3, although the latter do not fit well in the transmission ratio range of the corresponding transmission G. A first additional gear Z1 is thus selected by engaging the first shifting element B1, the third shifting element K1 and the sixth shifting element B3 or K4, whereas a second additional gear Z2 is selected by actuating the first shifting element B1, the third shifting element K1 and the fourth shifting element K2. Lastly, it is possible to shift into a third additional gear Z3 by engaging the second shifting element B2, the third shifting element K1 and the fifth shifting element K3.

As illustrated in FIGS. 2 to 6, the first shifting element B1 is embodied as a force-locking shifting element. However, the first shifting element B1 could also be realized as a positively locking shifting element, for example as a synchronizer or jaw clutch element.

Furthermore, the transmissions G according to the embodiments of FIGS. 3 to 5 can be hybridized in a manner analogous to the variant according to FIG. 6. In addition, a power take-off PTO can be realized in the embodiments according to FIGS. 5 to 6, also in a manner analogous to the variant illustrated in FIG. 3.

The designs according to the invention enable the realization of a compact and highly efficient transmission.

REFERENCE NUMERALS

G Transmission
GG Non-rotating component

P1 First planetary gear set
E11 First element of the first planetary gear set
E21 Second element of the first planetary gear set
E31 Third element of the first planetary gear set
P2 Second planetary gear set
E12 First element of the second planetary gear set
E22 Second element of the second planetary gear set
E32 Third element of the second planetary gear set
P3 Third planetary gear set
E13 First element of the third planetary gear set
E23 Second element of the third planetary gear set
E33 Third element of the third planetary gear set
P4 Fourth planetary gear set
E14 First element of the fourth planetary gear set
E24 Second element of the fourth planetary gear set
E34 Third element of the fourth planetary gear set
P5 Fifth planetary gear set
E15 First element of the fifth planetary gear set
E25 Second element of the fifth planetary gear set
E35 Third element of the fifth planetary gear set
B1 First shifting element
B2 Second shifting element
K1 Third shifting element
K2 Fourth shifting element
K3 Fifth shifting element
B3 Sixth shifting element
K4 Seventh shifting element
1 First forward gear
2.1 Second forward gear
2.2 Second forward gear
2.3 Second forward gear
2.4 Second forward gear
3 Third forward gear
4 Fourth forward gear
5 Fifth forward gear
6 Sixth forward gear
7 Seventh forward gear
8 Eighth forward gear
9 Ninth forward gear
10 Tenth forward gear
R1 First reverse gear
R2 Second reverse gear
Z1 First additional gear
Z2 Second additional gear
Z3 Third additional gear
GW1 Drive shaft
GW1-A Transmission input
GW-2 Output shaft
GW2-A Transmission output
PTO Power take-off
EM Electric machine
S Stator
R Rotor
AN Coupling shaft
K0 Separating clutch
VKM Internal combustion engine
TS Torsional vibration damper
AG Transaxle
DW Drive wheels

The invention claimed is:

1. A transmission for a motor vehicle comprising:
a transmission input,
a transmission output, and first, second, third, fourth and fifth planetary gear sets, and the first, the second, the third, the fourth and the fifth planetary gear sets each comprising first, second and third elements, first, second, third, fourth, fifth and sixth shifting elements are selectively actuatable to implement a plurality of power flows and different gears via the first, the second, the third, the fourth and the fifth planetary gear sets located between the transmission input and the transmission output;
the third element of the second planetary gear set and the second element of the third planetary gear set are connected with one another in a rotationally fixed manner and are jointly connectable, via the first shifting element, to a non-rotating component;
the first element of the fourth planetary gear set being connectable, via the second shifting element, to the non-rotating component;
the transmission input being connected in a rotationally fixed manner to the first element of the second planetary gear set,
the second element of the second planetary gear set being connected in a rotationally fixed manner to the third element of the fourth planetary gear set;
the second element of the fourth planetary gear set being connected in a rotationally fixed manner to the transmission output and being connectable, via the third shifting element, for conjoint rotation with the second element of the fifth planetary gear set,
the second element of the fifth planetary gear set being connectable, by the fourth shifting element, for conjoint rotation with the first element of the fourth planetary gear set;
the first element of the third planetary gear set being connected in a rotationally fixed manner to the third element of the fifth planetary gear set,
the first element of the fifth planetary gear set is permanently fixed to the non-rotating component;
the third element of the third planetary gear set being connectable, via the fifth shifting element, in a rotationally fixed manner to the second element of the second planetary gear set and the third element of the fourth planetary gear set; and
in a case of the first planetary gear set, a first coupling couples the first element of the first planetary gear set to the non-rotating component, a second coupling couples the second element of the first planetary gear set to the transmission input, and a third coupling couples the third element of the first planetary gear set to the third element of the third planetary gear set, and two of the first, the second and the third couplings being connections for continuous conjoint rotation, and a remaining coupling forms, via the sixth shifting element, a conjointly rotating connection.

2. The transmission according to claim 1, wherein the second element of the first planetary gear set is connected for conjoint rotation with the transmission input, the third element of the first planetary gear set is connected for conjoint rotation with the third element of the third planetary gear set, and the first element of the first planetary gear set is connectable, via the sixth shifting element, to the non-rotating component.

3. The transmission according to claim 1, wherein the first element of the first planetary gear set is fixed to the non-rotatable component, the third element of the first planetary gear set is connected for conjoint rotation with the third element of the third planetary gear set, and the second element of the first planetary gear set is connectable to the transmission input, via the sixth shifting element, for conjoint rotation therewith.

4. The transmission according to claim 1, wherein the first element of the first planetary gear set is fixed to the non-rotating component, the second element of the first planetary gear set is connected for conjoint rotation with the transmission input, and the third element of the first planetary gear set is connectable to the third element of the third planetary gear set, via the sixth shifting element, for conjoint rotation therewith.

5. The transmission according to claim 1, wherein a first forward gear is implemented by engagement of the first, the fourth and the fifth shifting elements;
   a second forward gear is implemented by engagement of the first and the second shifting elements, and one of the fifth shifting element, the sixth shifting element, the third shifting element, and the fourth shifting element;
   a third forward gear is implemented by engagement of the second, the fourth and the fifth shifting elements;
   a fourth forward gear is implemented by engagement of the second, the fourth and the sixth shifting elements;
   a fifth forward gear is implemented by engagement of the second, the third and the sixth shifting elements;
   a sixth forward gear is implemented by engagement of the second, the fifth and the sixth shifting elements ;
   a seventh forward gear is implemented by engagement of the third, the fifth and the sixth shifting elements (B3 or K4);
   an eighth forward gear is implemented by engagement of the fourth, the fifth and the sixth shifting elements;
   a ninth forward gear is implemented by engagement of the third, the fourth and the sixth shifting elements;
   a tenth forward gear is implemented by engagement of the third, the fourth and the fifth shifting elements;
   a first reverse gear is implemented by engagement of the first, the fourth and the sixth shifting elements; and
   a second reverse gear is implemented by engagement of the first, the third and the fifth shifting elements.

6. The transmission according to claim 5, wherein a first additional gear is implemented by engagement of the first, the third and the sixth shifting elements;
   a second additional gear is implemented by engagement of the first, the third and the fourth shifting elements; and
   a third additional gear is implemented by engagement of the second, the third and the fifth shifting elements.

7. The transmission according to claim 1, wherein the first, the second, the third and the fourth planetary gear sets are minus planet sets, and the first elements of the first, the second, the third and the fourth planetary gear sets, respectively, are sun gears, the second elements of the first, the second, the third and the fourth planetary gear sets, respectively, are planetary carriers, and the third elements of the first, the second, the third and the fourth planetary gear sets, respectively, are ring gears.

8. The transmission according to claim 1, wherein the first, the second, the third, the fourth and the fifth planetary gear sets are plus planet sets, and the first elements of the first, the second, the third, the fourth and the fifth planetary gear sets are sun gears, the second elements of the first, the second, the third, the fourth and the fifth planetary gear sets are ring gears, and the third elements of the first, the second, the third, the fourth and the fifth planetary gear sets are planetary carriers.

9. The transmission according to claim 1, wherein at least one of the first, the second, the third, the fourth, the fifth and the sixth shifting elements is a force-locking shifting element.

10. The transmission according to claim 1, wherein the first shifting element is a positively locking shifting element.

11. The transmission according to claim 1, wherein the transmission input is coupled to a power take-off for conjoint rotation therewith.

12. The transmission according to claim 1, wherein the transmission input is formed on a drive shaft and the transmission output is formed on an output shaft, and the drive shaft and the output shaft are coaxially aligned with one another.

13. The transmission according to claim 1, further comprising an electric machine having a rotor which is coupled to rotatable component.

14. The transmission according to claim 13, further comprising a separating clutch which couples the transmission input to a coupling shaft for conjoint rotation therewith.

15. A motor vehicle drive train comprising a transmission comprising:
   a transmission input,
   a transmission output, and first, second, third, fourth and fifth planetary gear sets, and the first, the second, the third, the fourth and the fifth planetary gear sets each comprising first, second and third elements,
   first, second, third, fourth, fifth and sixth shifting elements are selectively actuatable to implement a plurality of power flows and different gears via the first, the second, the third, the fourth and the fifth planetary gear sets located between the transmission input and the transmission output;
   the third element of the second planetary gear set and the second element of the third planetary gear set are connected with one another in a rotationally fixed manner and are jointly connectable, via the first shifting element, to a non-rotating component;
   the first element of the fourth planetary gear set being connectable, via the second shifting element, to the non-rotating component;
   the transmission input being connected in a rotationally fixed manner to the first element of the second planetary gear set,
   the second element of the second planetary gear set being connected in a rotationally fixed manner to the third element of the fourth planetary gear set;
   the second element of the fourth planetary gear set being connected in a rotationally fixed manner to the transmission output and being connectable, via the third shifting element, for conjoint rotation with the second element of the fifth planetary gear set,
   the second element of the fifth planetary gear set being connectable, by the fourth shifting element, for conjoint rotation with the first element of the fourth planetary gear set;
   the first element of the third planetary gear set being connected in a rotationally fixed manner to the third element of the fifth planetary gear set,
   the first element of the fifth planetary gear set is permanently fixed to the non-rotating component;
   the third element of the third planetary gear set being connectable, via the fifth shifting element, in a rotationally fixed manner to the second element of the second planetary gear set and the third element of the fourth planetary gear set; and
   in a case of the first planetary gear set, a first coupling couples the first element of the first planetary gear set to the non-rotating component, a second coupling couples the second element of the first planetary gear set to the transmission input, and a third coupling couples the third element of the first planetary gear set to the third element of the third planetary gear set, and two of the first, the second and the third couplings being connections for continuous conjoint rotation, and a remaining coupling forms, via the sixth shifting element, a conjointly rotating connection.

16. A transmission for a motor vehicle, the transmission comprising:

a transmission input;

a transmission output;

first, second, third, fourth and fifth planetary gear sets, and each of the first, the second, the third, the fourth and the fifth planetary gear sets having a first element, a second element and a third element;

first, second, third, fourth, fifth and sixth shifting elements, and selective engagement of three of the first, the second, the third, the fourth, the fifth and the sixth shifting elements implementing a plurality of different transmission gear ratios and power flow paths through the first, the second, the third, the fourth and the fifth planetary gear sets from the transmission input to the transmission output;

the third element of the second planetary gear set being permanently connected to the second element of the third planetary gear set, and the third element of the second planetary gear set and the second element of the third planetary gear set both being connectable, via the first shifting element, to a non-rotating housing component;

the first element of the fourth planetary gear set being connectable, via the second shifting element, to the non-rotating housing component;

the transmission input being connected in a rotationally fixed manner to the first element of the second planetary gear set;

the second element of the second planetary gear set being connected in a rotationally fixed manner to the third element of the fourth planetary gear set;

the second element of the fourth planetary gear set being connected in a rotationally fixed manner to the transmission output, and the second element of the fourth planetary gear set being connectable, via the third shifting element, to the second element of the fifth planetary gear set;

the second element of the fifth planetary gear set being connectable, via the fourth shifting element, to the first element of the fourth planetary gear set;

the first element of the third planetary gear set being connected in a rotationally fixed manner to the third element of the fifth planetary gear set;

the first element of the fifth planetary gear set being permanently connected to the non-rotating housing component;

the third element of the third planetary gear set being connectable, via the fifth shifting element, to the second element of the second planetary gear set;

the first planetary gear set having first, second and third couplings, the first coupling connecting the first element of the first planetary gear set to the non-rotating housing component, the second coupling connecting the second element of the first planetary gear set to the transmission input, and the third coupling connecting the third element of the first planetary gear set to the third element of the third planetary gear set, two of the first, the second and the third couplings being continuous conjoint rotational connections and a remaining one of the couplings being a releasable conjoint rotation connection implemented by the selective engagement of the sixth shifting element.

* * * * *